(12) United States Patent
Gage

(10) Patent No.: US 12,133,146 B2
(45) Date of Patent: *Oct. 29, 2024

(54) SYSTEMS AND METHODS FOR NETWORK SLICE ATTACHMENT AND CONFIGURATION

(71) Applicant: HUAWEI TECHNOLOGIES CO., LTD., Shenzhen (CN)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 262 days.

This patent is subject to a terminal disclaimer.

(21) Appl. No.: 17/331,064

(22) Filed: May 26, 2021

(65) Prior Publication Data

US 2021/0281983 A1    Sep. 9, 2021

Related U.S. Application Data

(63) Continuation of application No. 15/590,580, filed on May 9, 2017, now Pat. No. 11,026,060.

(Continued)

(51) Int. Cl.
*H04W 4/08* (2009.01)
*H04L 41/0806* (2022.01)
(Continued)

(52) U.S. Cl.
CPC .......... *H04W 4/08* (2013.01); *H04L 41/0806* (2013.01); *H04L 41/5041* (2013.01);
(Continued)

(58) Field of Classification Search
CPC ..... H04L 67/32; H04L 41/12; H04L 41/0803; H04L 63/10; H04L 12/4641; H04L 41/50;
(Continued)

(56) References Cited

U.S. PATENT DOCUMENTS

2006/0111082 A1* 5/2006 Zhang ................ H04W 12/06
455/411
2015/0139085 A1* 5/2015 Kaczmarska-Wojtania .............
H04W 8/20
370/329

(Continued)

FOREIGN PATENT DOCUMENTS

CN    101026861 A    8/2007
CN    101090559 A    12/2007
(Continued)

OTHER PUBLICATIONS

3GPP TR 23.799 V0.4.0 (Apr. 2016); 3rd Generation Partnership Project; Technical Specification Group Services and System Aspects; Study on Architecture for Next Generation System(Release 14);total 92 pages.

(Continued)

*Primary Examiner* — Nizar N Sivji
*Assistant Examiner* — Jing Gao (57) ABSTRACT

A method for slice attachment and configuration, the method comprises: receiving a service request from a user equipment; selecting a second network node to process the service request; receiving a configuration for a network slice to enable the service requested by the user equipment; identifying a first point of presence to receive user plane information corresponding to the network slice; identifying a second point of presence to receive control plane information corresponding to the network slice; forwarding traffic corresponding to the network slice to a third point of presence; transmitting to the user equipment a handle identifying the user equipment context and the network slice configuration; and transmitting to the user equipment a user equipment configuration corresponding to the network slice.

19 Claims, 9 Drawing Sheets

Related U.S. Application Data (60) Provisional application No. 62/336,297, filed on May 13, 2016.

(51) Int. Cl.

| | | |
|---|---|---|
| *H04L 41/5041* | (2022.01) | |
| *H04L 67/1014* | (2022.01) | |
| *H04L 67/1023* | (2022.01) | |
| *H04L 67/104* | (2022.01) | |
| *H04W 4/70* | (2018.01) | |
| *H04W 36/26* | (2009.01) | |
| *H04W 48/18* | (2009.01) | |
| *H04L 41/12* | (2022.01) | |

(52) U.S. Cl.
CPC ...... *H04L 67/1014* (2013.01); *H04L 67/1023* (2013.01); *H04L 67/1044* (2013.01); *H04W 4/70* (2018.02); *H04W 36/26* (2013.01); *H04W 48/18* (2013.01); *H04L 41/12* (2013.01)

(58) Field of Classification Search
CPC ..... H04L 63/08; H04L 45/306; H04L 45/745; H04L 63/104; H04L 63/12; H04L 41/0806; H04L 41/5041; H04L 67/1014; H04L 67/1023; H04L 67/1044; H04W 12/06; H04W 48/18; H04W 88/02; H04W 28/0247; H04W 36/22; H04W 72/048; H04W 88/08; H04W 72/14; H04W 76/12; H04W 72/0486; H04W 76/16; H04W 88/18; H04W 8/183; H04W 4/08; H04W 4/70; H04W 36/26
See application file for complete search history.

(56) References Cited

U.S. PATENT DOCUMENTS

2015/0365288 A1  12/2015  Van Der Merwe et al.
2017/0164212 A1*  6/2017  Opsenica ................ G06F 16/41
2017/0365288 A1  12/2017  Van Der Merwe et al.

FOREIGN PATENT DOCUMENTS

| CN | 103269282 A | 8/2013 |
|---|---|---|
| CN | 103650437 A | 3/2014 |
| CN | 107295609 A | 10/2017 |
| JP | 2015032932 A | 2/2015 |
| JP | 2015154278 A | 8/2015 |

OTHER PUBLICATIONS

Takuya Shimojou " Technology Reports-Future core network for the 5G era"; 2016 NTT Docomo, Inc; Jan. 31, 2016.

Hisashi Kojima "Service chaining methods for network function virtualization on carrier networks"; vol. 113 No. 205 IEICE Technical Report, Sep. 5, 2013.

Huawei, "RAN Support for Core Network Slicing"RAN WG3 Meeting #93 R3-161759, Gothenburg, Sweden, Aug. 22-26, 2016, total 14 pages.

3GPP TR 23.799 V0.4.0 (Apr. 2016), 3rd Generation Partnership Project; Technical Specification Group Services and System Aspects; Study on Architecture for Next Generation System (Release 14), 96 pages.

3GPP TR 22.891 V1.2.0 Feasibility Study on New Services and Markets Technology Enablers, Nov. 2015.

International Search Report dated Jul. 13, 2017 for corresponding International Application No. PCT/CN2017/083986 filed May 11, 2017.

3 GPP TSG SA Study on Architecture for Next Generation System (Release 14) 3GPP TR 23.799 V0.3.0 Mar. 31, 2016.

SA WG2 Meeting #S2-113ah,S2-161326:"Solution: Network Slicing", Nokia Networks, Alcatel-Lucent,Feb. 23-26, 2016, Sophia Antipolis, FR, total 4 pages.

* cited by examiner

SYSTEMS AND METHODS FOR NETWORK SLICE ATTACHMENT AND CONFIGURATION

CROSS REFERENCE TO RELATED APPLICATIONS

The present application is a continuation of U.S. patent application Ser. No. 15/590,580 entitled SYSTEMS AND METHODS FOR NETWORK SLICE ATTACHMENT AND CONFIGURATION filed May 9, 2017 and claims the benefit of and priority to U.S. provisional Patent Application No. 62/336,297 filed May 13, 2016 entire content of which is incorporated herein by reference.

FIELD OF THE INVENTION

The present application pertains to the field of communication networks. More particularly, the present application relates to systems and methods for attaching user equipment to network slices and configuration thereof.

BACKGROUND

Communication networks enabled by technologies such as network function virtualization, software defined networking, and the like, may be flexibly organized so as to service various customer demands. In building advanced networks, such as those to support future developments in wireless networks (including next generation wireless, or 5th generation networks), network slicing provides the ability to create isolated virtual networks which independently manage different traffic flows over a network. However, managing variable and competing demands on a potentially large network scale is a complex proposition requiring an effective architecture and management thereof.

The above information is provided for the purpose of making known information believed by the applicant to be of possible relevance to the present invention. No admission is necessarily intended, nor should be construed, that any of the preceding information constitutes prior art against the present invention.

SUMMARY

An object of embodiments of the present application is to provide systems and methods for network slice attachment and configuration.

In accordance with a first aspect of the present invention, there is provided a method for slice attachment and configuration that can be performed at a network node. The method comprises receiving, by the network node, a service request from a user equipment; selecting, by the network node, a second network node to process the service request; receiving, by the network node, a configuration for a network slice to enable the service requested by the user equipment; identifying, by the network node, a first point of presence to receive user plane information corresponding to the network slice; identifying, by the network node, a second point of presence to receive control plane information corresponding to the network slice; and forwarding, by the network node, traffic corresponding to the network slice to a third point of presence; transmitting to the user equipment, by the network node, a handle identifying the user equipment context and the network slice configuration; and transmitting to the user equipment, by the network node, a user equipment configuration corresponding to the network slice.

In an embodiment of the first aspect of the present invention, the service request comprises any one or more of: a descriptor; a request for a particular slice; and a handle identifying a particular user equipment context and network slice configuration, and optionally the descriptor can comprise any one or more of: an application identifier; a type of service; and a slice identifier. In another embodiment, selecting the second network node is based on the service request. In a further embodiment, the received configuration for the network slice is cached by the network node and associated with the service request, and optionally the selection of the second network node is based on information cached by the network node. In another embodiment, the second network node instructs the network node to redirect the service request to a third network node. In a further embodiment, the network node is either one or both of a radio access network node and a core network node. In a further embodiment, the second network node is a core network node. In some embodiment, the handle is cryptographically protected. In another embodiment, the user equipment configuration comprises any one or more of: a first radio bearer corresponding to the first point of presence; and a second radio bearer corresponding to the second point of presence.

In accordance with a second aspect of the present invention, there is provided a network node comprising: one or more processors and a computer readable storage medium. The storage medium stores instructions that can be executed by the one or more processors such that upon execution it causes the one or more processors to configured the network node to receive a service request from a user equipment; select a second network node to process the service request; receive a configuration for a network slice to enable the service requested by the user equipment; identify a first point of presence to receive user plane information corresponding to the network slice; identify a second point of presence to receive control plane information corresponding to the network slice; forward traffic corresponding to the network slice to a third point of presence; transmit, to the user equipment, a handle identifying the user equipment context and the network slice configuration; and transmit, to the user equipment, a user equipment configuration corresponding to the network slice.

In an embodiment of the second aspect of the present invention, the service request comprises any one or more of: a descriptor; a request to a particular slice; and a handle identifying a particular UE context and network slice configuration. In another embodiment, the descriptor comprises any one or more of: application identifier; a type of service; and a slice identifier. In another embodiment, upon execution, of the software instructions the one or more processor cause the network node to select the second network node based on the service request from the user equipment. In a further embodiment, the software instructions include instructions to cache the received configuration for a network slice and associate the received configuration with the service request, and optionally instruction are included that cause the network node to be configured to select the second network node based on information cached by the network node. In another embodiment, the software instructions include instructions to redirect the service request to a third network node. In a further embodiment, the software instructions further include instructions to cryptographically protect the handle. In another embodiment, the software instructions include instructions to configure the user equipment with any one or more of: a first radio bearer corresponding to the first point of presence; and a second radio bearer corresponding to the second point of presence. In a further embodiment, the network node is either one or both of a radio access network node and a core network node.

Those skilled in the art will appreciate that the embodiments of the aspects of the invention can be implemented upon the aspect that they are described in relation to in isolation, or in combination with other embodiments. In some situations, embodiments may also be implemented on another aspect or embodiment as applied to another aspect. Those skilled in the art will appreciate that some embodiments may be mutually exclusive, in which case they cannot be combined with each other.

BRIEF DESCRIPTION OF THE FIGURES

Further features and advantages of the present invention will become apparent from the following detailed description, taken in combination with the appended drawings, in which.

DETAILED DESCRIPTION

Figure 1:
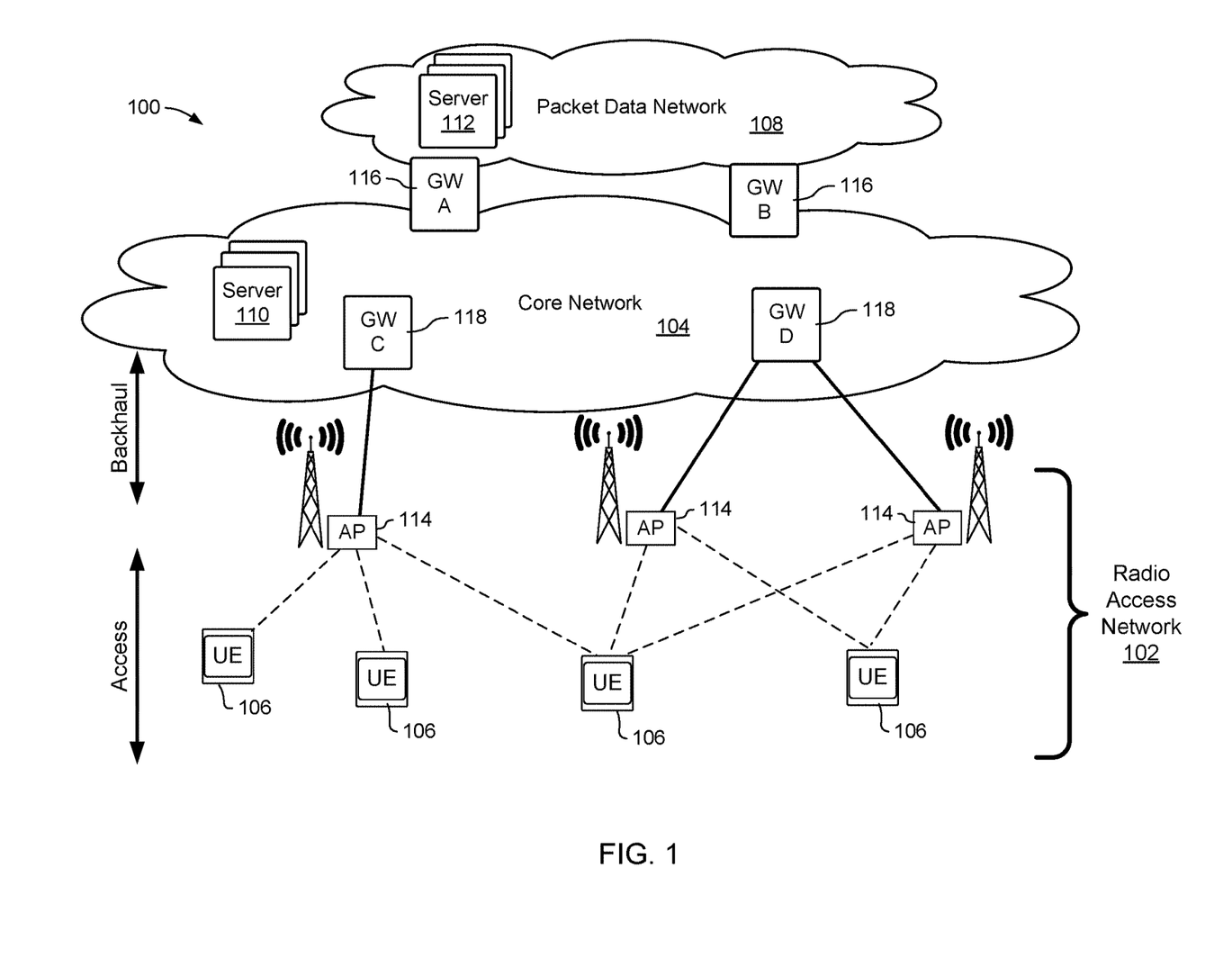
FIG. 1 is a block diagram schematically illustrating an architecture of a representative network in which embodiments of the present invention may be deployed.

FIG. 1 is a block diagram schematically illustrating an architecture of a representative network 100 in which embodiments of the present invention may be deployed. The network 100, may be a public land mobility network (PLMN) comprising a radio access network (RAN) 102, and a core network (CN) 104 through which a user equipment (UE) 106 may access a packet data network 108. PLMN 100 may be configured to provide connectivity between user equipment (UE) 106 such as mobile communication devices, and servicers such as server 110 or 112 which can be in core network 104 and packet data network 108 respectively. Thus, network 100 may enable end-to-end communications services. As may be seen in FIG. 1, the RAN 102 comprises a plurality of radio access points (APs) 114 that are connected to one or more packet data gateways (GWs) 116 through an access gateway 118 and the core network 104. In the Third Generation Partnership Project (3GPP) Long Term Evolution (LTE) communications standard, an AP 114 may also be referred to as an evolved Node-B (eNodeB, or eNB), while in the 3GPP 5G communications standard, an AP may also be referred to as a gNB. In this disclosure, the terms access point (AP), evolved Node-B (eNB), eNodeB and gNB will be treated as being synonymous, and may be used interchangeably. In an LTE core network, the packet data gateway 116 may be a packet data network gateway (PGW), and in some embodiments the access gateway 118 could be a serving gateway (SGW). In a 5G core network, the packet data gateway 116 may be a user plane function (UPF), and in some embodiments the access gateway 118 could be a user plane gateway (UPGW).

The APs 114 typically include radio transceiver equipment for maintaining wireless connections with the UEs 106, and one or more interfaces for transmitting data or signalling to the core network 104. Each GW 116 provides a link between the core network 104 and the packet data network 108, and so enables traffic flows between the packet data network 108 and UEs 106. It is common to refer to the connections between the APs and the UEs (along with the nodes themselves) as the radio access network 102, while the GWs 116 and 118 and functions hosted on server 110 and others like it are referred to as the core network 104. Links between the APs 114 and a GW 116 are known as the "backhaul" network which may be composed of both wired and wireless links.

Typically, traffic flows to and from UEs 106 are associated with specific services of the packet data network 108 and/or the core network 104. As is known in the art, a service of the packet data network 108 will typically involve one or more protocol data unit (PDU) sessions between one or more servers 112 in the packet data network 108 and a UE 106 via one or more of the GWs 116 and 118. Similarly, a service of the core network 104 will involve one or more PDU sessions between one or more servers 110 of the core network 104 and a UE 106.

Although the discussion presented herein focuses on a radio access network communicating with user equipment over wireless communications links, the example embodiments presented herein are also applicable to other types of access networks and user equipment, e.g., a wireline access network communicating with user equipment over wired communications links. Therefore, the focus on the radio access network should not be construed as being limiting to either the scope or the spirit of the example embodiments.

Network slicing refers to a technique for creating virtual networks which separate different types of network traffic, and which can be used in reconfigurable network architectures such as networks employing network function virtualization (NFV). A network slice (as defined in 3GPP TR 22.891 entitled "Study on New Services and Markets Technology Enablers," Release 14, Version 1.2.0, Jan. 20, 2016) is composed of a collection of logical network functions that supports communication service requirements of particular use cases. More broadly, a network "slice" (in one or both of the core network 104 or the RAN 102) is defined as a collection of one or more network functions which are grouped together for some arbitrary purpose. This collection may be based on any suitable criteria such as, for example, business aspects (e.g. customers of a specific mobile virtual network operator (MVNO)), quality of service (QOS) requirements (e.g. latency, minimum data rate, prioritization etc.); traffic parameters (e.g. mobile broadband (MBB), machine type communication (MTC) etc.), or use case (e.g. machine-to-machine communication; Internet of Things (IoT), etc.). One use of network slicing is within the core network 104 of a communications network. Through the use of network slicing, different service providers can have distinct virtual networks that run on the same physical set of computing, storage and networking resources as the core network. It should be understood that this discussion is not intended to exclude the application of network slicing as it applies to the radio access edge of the radio access network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

Figure 2A:
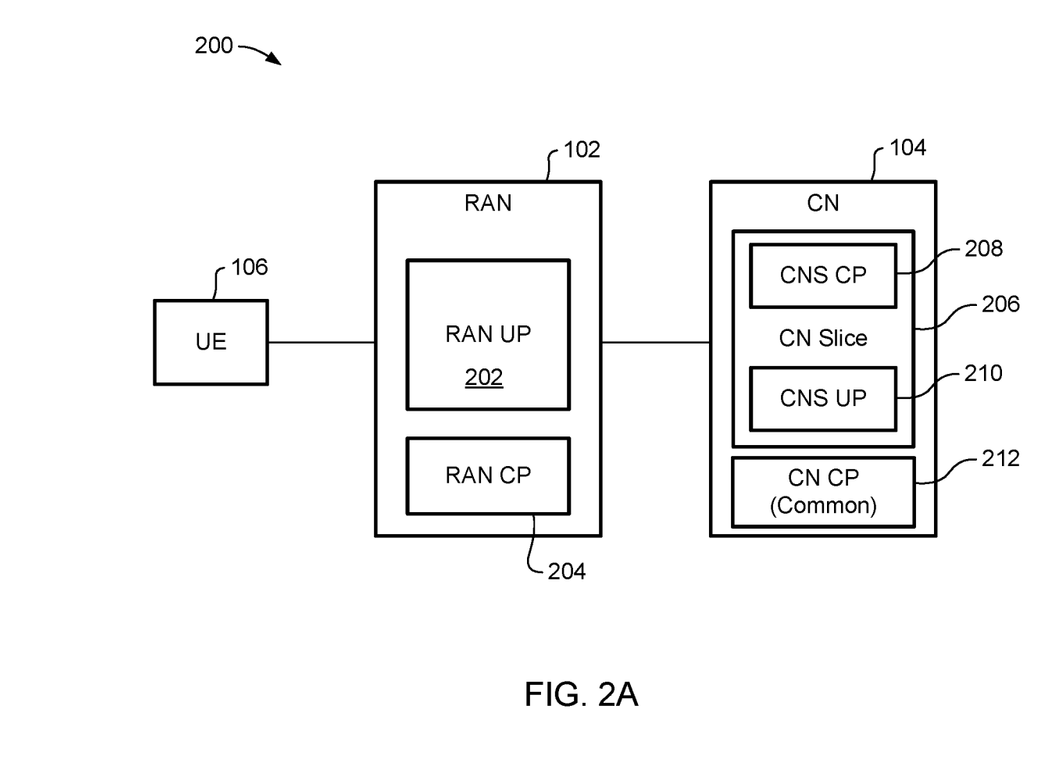
FIG. 2A is a schematic diagram of a communications network architecture, according to an embodiment.

Referring to FIG. 2A, there is shown a schematic diagram of a communications network architecture 200, according to an embodiment. The communications network architecture 200 includes a user equipment (UE) 106, a radio access network (RAN) 102, and a core network (CN) 104, communicatively intercoupled as shown. The RAN 102 may comprise one or more nodes (such as a base station, gNB, eNodeB, antenna, radio edge node, and so forth) that establish a wireless link with the UE 106 in order to transmit and receive data flows (e.g. data packets) therebetween. The RAN 102 includes a RAN user plane (RAN UP) function 202 and a RAN control plane (RAN CP) function 204 in order to manage data flows separated by user plane and control plane functionality. The CN 104 may also comprise one or more nodes, having processing and computing resources necessary to, for example, process a service request from the UE 106 relayed through the RAN 102. The CN 102 may include a CN slice (i.e. a network slice) 206 deployed thereon for managing a set of flows corresponding to the UE 106, for example. The CN slice 206 includes a CN slice control plane (CNS CP) function 208 and a CN slice user plane (CNS UP) function 210 for managing slice specific flows separated by user plane and control plane functionality. A common CN CP 212 may also be provided to support CP functions that are not slice specific.

In certain embodiments, a mobile network operator (MNO, not shown) may create a customised set of network slices on the CN 104 (such as CN slice 206) using physical and/or virtualised network functions to meet their business and service needs. In some instances, the network slice may be pre-configured, but in other instances, the network slice may be dynamically commissioned or re-configured to meet traffic demands. A slice identifier (not shown) may be used within the CN 104 to reference a particular network slice or an instance of a network slice within a particular MNO network at a particular location and at a particular point in time. However, the slice identifier may be limited for use within the CN 104, and may have limited function outside the CN 104 where the network slice was created.

The UE 106 may use a multi-dimensional descriptor (hereinafter "descriptor") to gain access to differentiated services offered by the MNO. The descriptor (which may include an application identifier, a type of service, etc) may have global significance (i.e. the service can be requested on a visited network by a roaming UE) or may have only local significance (i.e. the service can only be requested when a UE is connected to its home network). In general, the descriptor provides information that may be used (for example by either one or both of the RAN 300 and CN 302) to identify an appropriate slice or instance of a slice for the requested service. While the descriptor may be valid across two or more domains (e.g. as a text string like a URL (Universal Resource Locator) or an APN (Access Point Name)), it may not be meaningful to the RAN 102 but can be used by the CN 104 to identify an appropriate network slice.

In some cases, the CN 104 may indicate that slice-related configuration information may be cached by the RAN 102 for a specific amount of time or until explicitly invalidated by the CN 104. If the RAN 102 matches a received descriptor to a cached slice configuration, this configuration can be used by the RAN 102 for forwarding slice-related traffic and for providing the appropriate QoS (quality of service).

In other cases, the slice-related information may be pre-configured in both CN 104 and RAN 102 and the UE 106 may be provided with a descriptor that includes a slice identifier. When the RAN 102 receives a descriptor from a UE 106 that includes a slice identifier, this can be used by the RAN 102 to identify the configuration information for forwarding slice-related traffic and for providing the appropriate QoS.

Following successful attachment of a UE 106 to a network slice 206 (and hence to a network service), the RAN 102 may provide a "handle" to the UE 106 that may be subsequently used by the UE 106 to request re-connection to the slice 206. A handle is a reference to a particular UE context and network slice configuration that was previously supplied to the RAN 102 by the CN 104. The handle however, may have limited function and meaning used outside the RAN 102 where the handle was assigned, and thus the UE 106 may have to treat the handle as an opaque octet string.

For improved flexibility and to allow independent evolution of both RAN 102 and CN 104 operation, a network slice attachment (selection) procedure in the RAN 102 may include the following steps. First, use a multi-dimensional descriptor to determine the network slice that can be used to convey service-specific traffic for a particular UE. In some cases, the descriptor may be provided by the UE; in other cases, the (default) descriptor may be determined by the CN based, for example, on the UE service profile. If there is insufficient information in the descriptor to allow the RAN to identify pre-configured or cached slice information, the descriptor is forwarded to the CN for slice attachment/selection. Second, use information that is provided by the CN or pre-configured to determine where to forward uplink traffic associated with the UE and the selected network slice. Third, use information that is provided by the CN or pre-configured to determine the treatment to be afforded traffic associated with the selected slice. The prescribed treatment may govern operation over the radio link as well as operation over the transport network layer to enable the appropriate end-to-end QoS and handling of UE traffic. Finally, inform the CN where to forward downlink traffic associated with the UE and the selected slice.

Figure 2B:
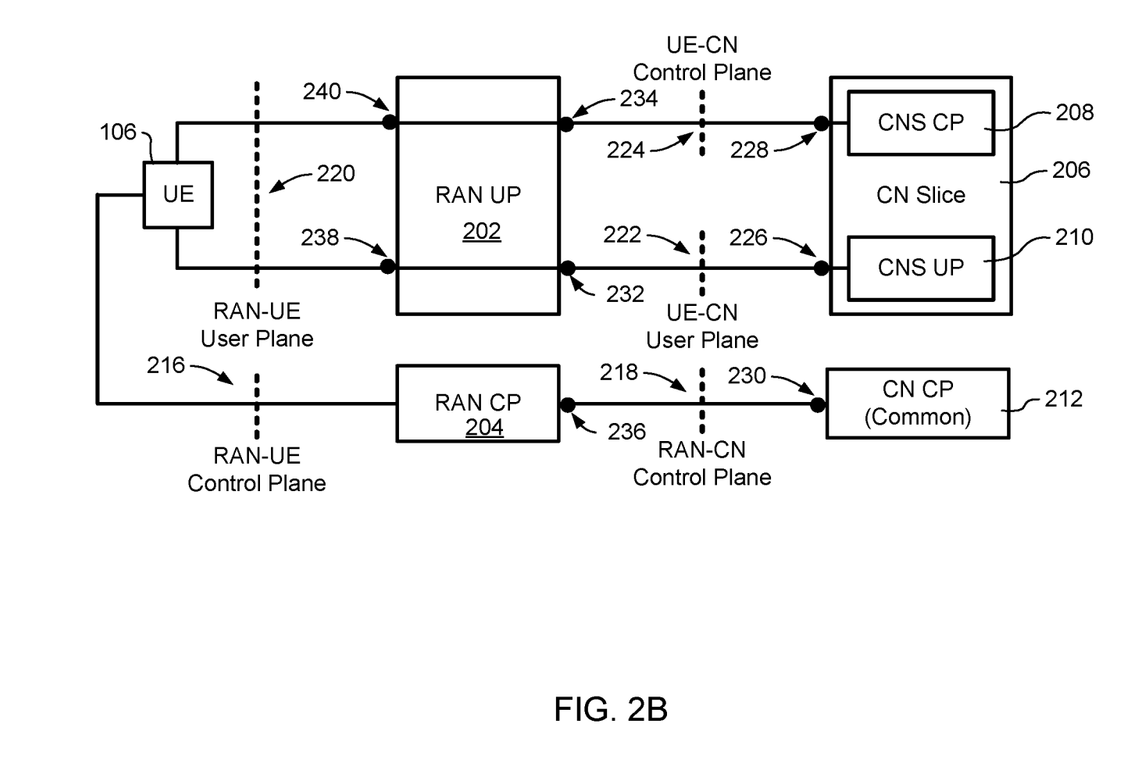
FIG. 2B illustrates a functional diagram of the communications network architecture of FIG. 2A, divided by control plane and user plane functionality, according to an embodiment.

Referring to FIG. 2B, there is shown a functional schematic of the communications network architecture of FIG. 2A, divided by control plane (CP) and user plane (UP) functionality, according to an embodiment. In the CP, the RAN 102 maintains a CP interface 216 (RAN-UE CP) over the radio link to a UE and a CP interface 218 (RAN-CN CP) to a set of common CN control plane functions.

The RAN 102 also maintains a user plane interface 220 (RAN-UE UP) over the radio link to a UE and transports user plane traffic between the UE 106 and the CN slice 206 over a UE-CN interface 222. The network slice 206 comprises network functions that are transparent to the RAN 102 and are hidden behind slice-specific points-of-presence (POP). A PoP is typically identified by a transport network layer (TNL) address or other end point identifier. User plane traffic between the UE 106 and user plane functions 210 of the network slice 206 is transported over the UE-CN UP interface 222 between the RAN 102 and a slice-specific CN UP PoP 226. Each CN UP PoP 226 may be associated with a GW 116 or 118 or with a server 110 in the core network 104.

In some embodiments, the CN slice 206 may also contain control plane functions 208 for interacting with the UE 106 over a UE-CN CP interface 224, which are treated as UP flows by the RAN 102. From the perspective of the RAN 102, UE-CN CP messages are transparently transported as distinguished user plane traffic with their own set of QoS parameters, transport network layer end points, and so forth. If the CN slice 206 includes slice-specific control plane functions 208, the control plane traffic between a UE 106 and the network slice 206 is transported over a UE-CN CP interface 224 between the RAN 102 and a slice-specific CN CP POP 228. Each CN CP POP 228 may be associated with a GW 116 or 118 or with a server 110 in the core network 104.

Figure 2C:
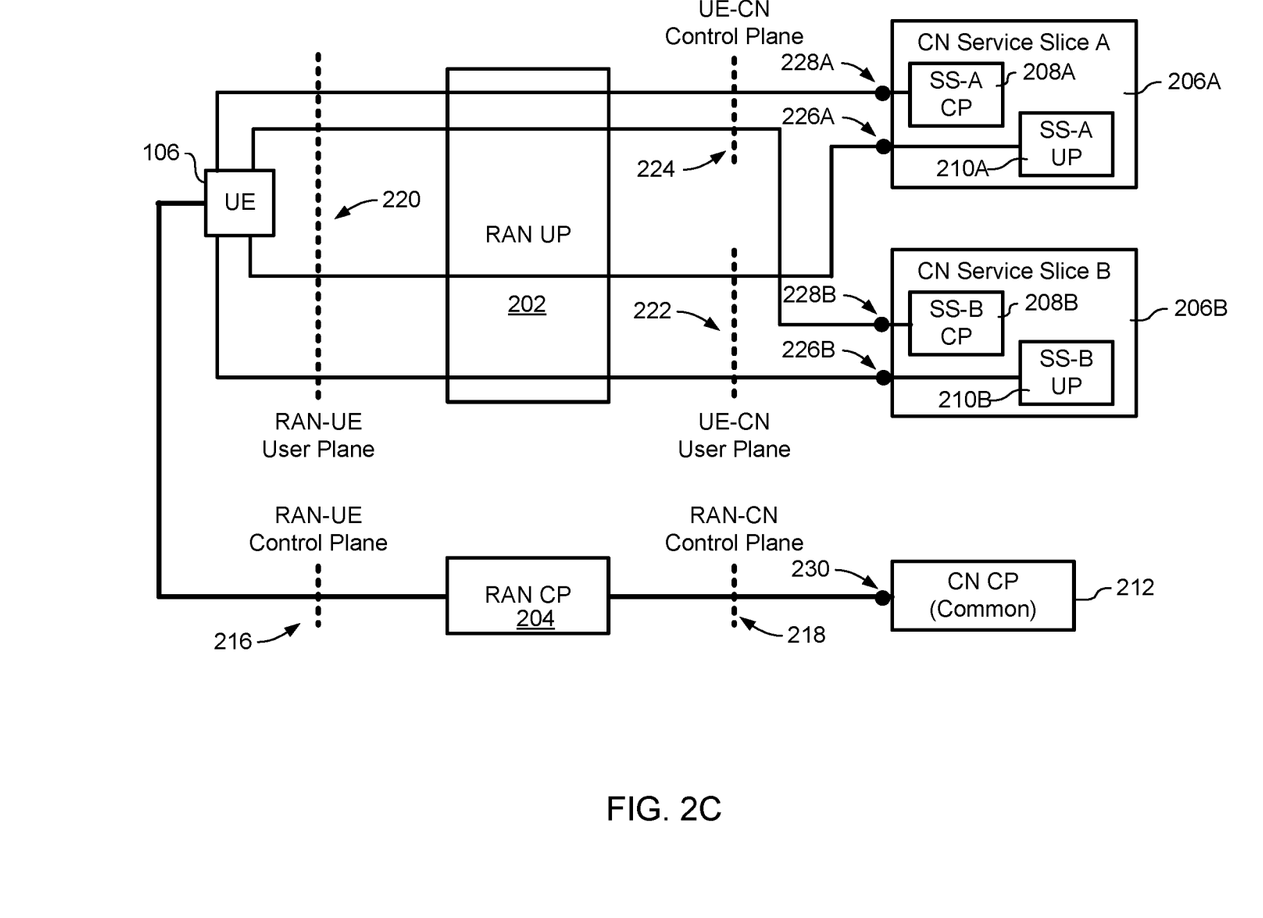
FIG. 2C illustrates a user equipment interfacing with multiple networks slice in the core network of FIG. 2A, according to another embodiment.

Referring to FIG. 2C, there is shown another embodiment of a functional schematic of the communications network architecture of FIG. 2A, where the UE 106 is simultaneously connected to multiple CN network slices including CN service slice A 206A and CN service slice B 206B. In this case, the RAN 102 can provide the interconnection between the UE 106 and each of the connected slices 206A and 206B via respective UP PoPs 226A and 226B and CP PoPs 228A and 228B.

Figure 3:
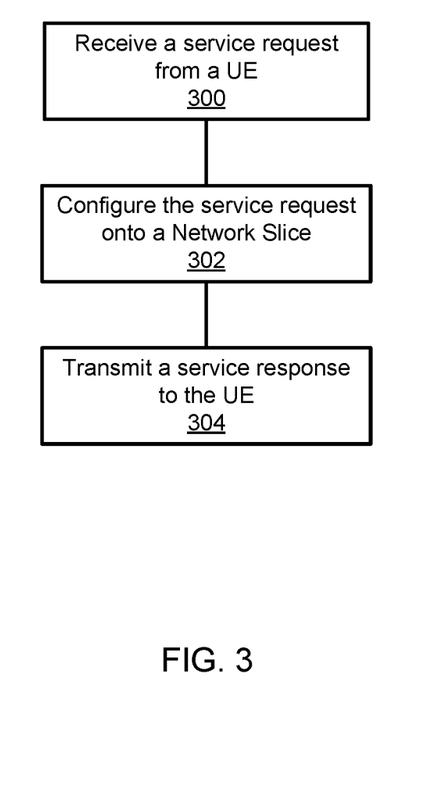
FIG. 3 is a flow chart illustrating a method for attaching a user equipment to a network slice, according to an embodiment.

Referring to FIG. 3, there is shown a flow chart illustrating a method for attaching a user equipment 106 to a network slice 206, according to an embodiment. For example, the method may be applied by the RAN CP 204 or CN CP 212 of the communications network architecture of FIG. 2A, for example. At step 300, a service request is received from a UE 106. In some embodiments, the service request may be received by a control plane management entity 204 of the RAN 102. In specific embodiments, such a RAN control plane management entity 204 may be instantiated in an access point 114 or a server (not shown) associated with the access point. The service request may include a descriptor, may be a request to attach to a particular CN slice 206, or may include a handle, as will be discussed in further detail below. In specific embodiments, the service request may include any suitable combination of a descriptor, request to a particular slice, and the handle. At step 302, the service request is configured onto a network slice 206. This may include carrying out various service authorization requests, connection requests, configuration requests, attachment requests, selection of a network slice on the CP, and so forth, as executed between the RAN and CN, for example. In specific embodiments, configuration of the service request onto a network slice may be performed by interaction between the RAN control plane management entity and a counterpart control plane management entity instantiated in a server of the Core Network. At step 304, a service response is transmitted to the UE (according to the configuration performed in step 302) in order to attach the UE to the network slice.

UE-Requested Association to a Network Slice

Figure 4:
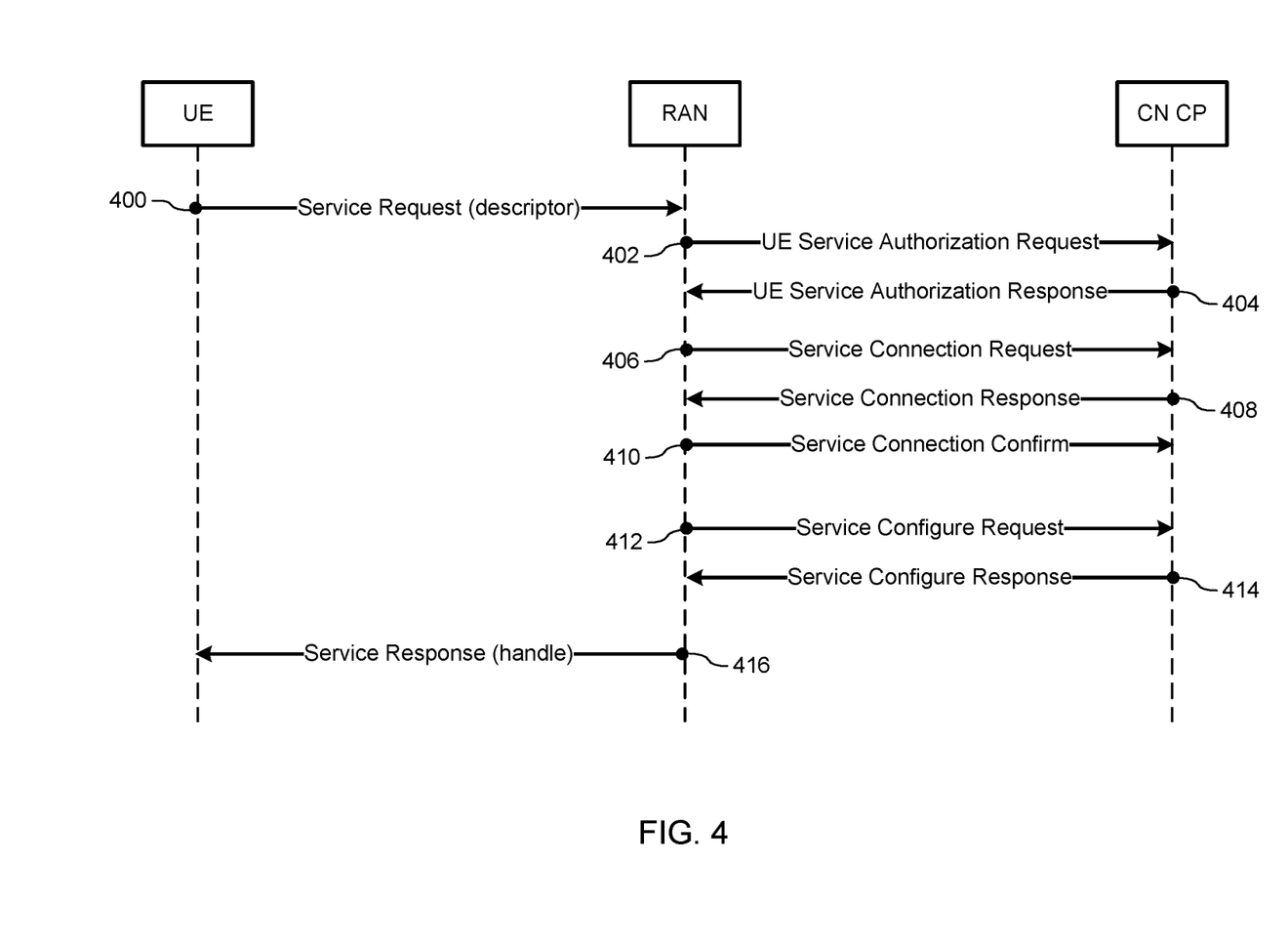
FIG. 4 is a message flow diagram illustrating a method for associating a user equipment to a network slice, according to an embodiment.

Referring to FIG. 4, there is shown a message flow diagram illustrating an embodiment of the method described above with reference to FIG. 3 used to process a UE requested association to a particular network slice (i.e. network service). In this embodiment, the UE explicitly requests access to a network service; this service is then mapped by the CN onto a corresponding network slice (which manages the service) which may or may not be pre-configured. Association to a network slice may be triggered by a specific service request, or by some other event such as a network attachment request.

The steps in the overall procedure of FIG. 4 are described below:

Following successful authentication and authorisation of a UE (not shown), the UE sends a [RAN-UE CP] service request (at 400) to the RAN requesting access to a particular network service. In a scenario in which this is an initial request for this service, the UE provides the multi-dimensional descriptor (descriptor) associated with the requested service.

If the RAN cannot match the descriptor to pre-configured or cached slice information, the RAN sends a [RAN-CN CP] UE service authorisation request (at 402) to a pre-determined CN CP function (e.g., CPF 01). In some embodiments, the pre-determined CN CP function (CPF 01) may correspond to a POP (e.g., PoP 230, FIGS. 2B and 2C) associated with the common CN CP 212. The request includes a UE identifier and the multi-dimensional descriptor provided by the UE.

If the RAN can match the descriptor to pre-configured or cached slice information, the procedure continues at step 412, below.

If the UE is authorised to access the requested network service, the CN CP function (CPF 01) responds (at 404) to the RAN with a [RAN-CN CP] UE service authorisation response. In some embodiments, the response can redirect the RAN to another CN CP entity for service authorisation. This may, for example, be required if authorisation is performed by a per-slice CN CP function. In this case, the RAN repeats step 402 by sending the UE service authorisation request to the designated CN CP entity. In some embodiments, the designated CN CP entity may correspond to a POP (e.g., PoP 228 (FIGS. 2B and 2C) associated with the per-slice CN CP function 208. If authorised, the response includes the identity of a CN CP function (e.g., CPF 02) that is responsible for commissioning a network slice to accommodate service-specific traffic for this UE. This parameter may also include TNL-specific information for communicating with the designated CP function (CPF 02). In some embodiments, the designated CP function (CPF 02) may be another common CN CP function 212 associated with a particular POP (e.g., PoP 230, FIGS. 2B and 2C). In other embodiments, the designated CP function (CPF 02) may be another per-slice CN CP function 208 associated with another PoP (e.g., PoP 228, FIGS. 2B and 2C).

The RAN sends a [RAN-CN CP] service connection request (at 406) to the CN CP function (CPF 02) identified by the POP in Step 404. The UE service connection request includes access information that may be used by the CN to identify and/or commission the network slice. The access information may include, for example, the UE device class, the type of channel used to access the network, the location of the UE, etc. As indicated above, the designated CN CP function (CPF 02) may be a common CN CP function 212 or a slice-specific CN CP function 208. The RAN may not make a distinction between these two cases.

When the corresponding network slice is available for use, the CN CP function (CPF 02) sends (at 408) a [RAN-CN CP] service connection response to the RAN that includes:

the identity (e.g., PoP 226) of a UE-CN UP function (e.g., UE_UPF) for receiving uplink user plane traffic associated with the commissioned network slice; this may also include TNL-specific information for communicating with the UE CN UP function (UE_UPF). The CN may not specify a UE-CN UP POP (UE_UPF) if uplink packets provided by the UE are to be forwarded by the TNL using information (e.g., destination address) contained in a packet header.

the user plane QoS parameters associated with the network slice.

the identity (e.g., PoP 228) of the UE-CN CP function (e.g., UE_CPF) for receiving uplink signalling traffic associated with the commissioned network slice. This parameter may be provided only if the network service includes slice-specific control plane functions for interacting with the UE. This parameter may also include TNL-specific information for communicating with the UE-CN CP function (UE_CPF).

the control plane QoS parameters associated with the network slice. These parameters may be provided only if the network service includes slice-specific control plane functions for interacting with the UE.

the identity (e.g. PoP 228) of a RAN-CN CP function (e.g., CPF 03) associated with the commissioned network slice that enables the exchange of per-UE, per-slice control information between the RAN and CN. This parameter may also include TNL-specific information for communicating with the designated CP function (CPF 03).

If the RAN can admit the service with the requested QoS, the RAN responds (at 410) with a [RAN-CN CP] service connection confirmation to the CN (CPF 02). If the RAN is unable to admit the service, the RAN would respond with a [RAN-CN CP] service connection error to the CN (CPF 02). If the CN (CPF 02) indicates that the information contained in the service connection response can be cached, the RAN may store this information and attempt to match future service requests against the cached information.

If admitted, the RAN sends a [RAN-CN CP] service configuration request (at 412) to the RAN CN CP function (CPF 03) identified by the POP in step 408. This request may include:

the destination (e.g., PoP 232 (FIG. 2B)) within the RAN to be used by the network service for downlink UE-CN UP traffic sent to the UE. This parameter (e.g., UE_U) may also include TNL-specific information for communicating with the RAN.

the destination (e.g., PoP 234 (FIG. 2B)) within the RAN to be used by the network service for downlink UE-CN CP traffic sent to the UE. This parameter (e.g., UE_C) may also include TNL-specific information for communicating with the RAN. This parameter is provided only if step 408 identified a slice-specific control plane function (UE_CPF) for interacting with the UE.

the destination (e.g., PoP 236 (FIG. 2B)) within the RAN to be used by the network service for downlink RAN-CN CP traffic sent to RAN concerning the UE. This parameter may also include TNL-specific information for communicating with the RAN.

Once configuration has been completed, the CN (CPF 03) sends a [RAN-CN CP] service configuration response (at 414) to the RAN.

The RAN sends a [RAN-UE CP] service response (at 416) to the UE indicating successful attachment to the requested network service. The response may include:

a handle that can be subsequently used by the UE to request reconnection to the network service (slice or slice instance).

the radio link logical channel to be used for conveying user plane traffic to the network slice.

the radio link logical channel to be used for conveying control plane traffic to the network slice. This parameter is provided only if the network service includes slice-specific control plane functions for interacting with the UE.

In certain embodiments, slice-specific traffic can be exchanged between the UE and selected network slice at this stage. In the RAN, this involves mapping between the logical channels on the RAN-UE interface and the slice-specific PoPs on the UE-CN (RAN-CN) interface. For example:

on the uplink, any traffic received by the RAN on the slice-specific user plane logical channel 238 (FIG. 2B) is forwarded to the POP (e.g., PoP 226 (FIG. 2B)) of the designated UE-CN UP function (UE_UPF). Similarly, any traffic received on the slice-specific control plane logical channel 240 (FIG. 2B) is forwarded to the POP (e.g., PoP 228 (FIG. 2B)) of the designated UE-CN CP function (UE_CPF).

on the downlink, any traffic received by the RAN on the designated UE-CN UP POP (e.g., Pop 232 (FIG. 2B)) associated with UE_U is forwarded over the radio interface using the slice-specific user plane logical channel 238 (FIG. 2B) associated with the UE. Similarly, any traffic received by the RAN on the designated UE-CN CP POP (e.g., PoP 234 (FIG. 2B)) associated with UE_C is forwarded over the radio interface using the slice-specific control plane logical channel 240 (FIG. 2B) associated with the UE.

Reconfiguring Network Slice-Related Information

In certain embodiments (not shown), the CN CP function 208 associated with a network slice (e.g., CPF-03) may send a message to the RAN indicating a change in the parameters associated with the transmission of network slice information over the RAN-CN interface. The indication may include:

a change in the Pops used for receiving slice-related uplink user plane traffic (e.g., PoP 226 (FIG. 2B) associated with UE_UPF) and/or uplink control plane traffic (e.g., PoP 228 (FIG. 2B) associated with UE_CPF). This may, for example, be due to load balancing or to migration of virtualised network functions;

a change in the POP (e.g. PoP 230 (FIG. 2B)) used for receiving resource configuration change requests (CPF-03);

a change in the QoS parameters associated with the network slice user plane traffic and/or control plane traffic.

Similarly, the RAN may send a message to the CN CP function 208 (CPF-03) indicating a change in parameters associated with the transmission of network slice traffic to the UE. The indication may include:

a change in the Pops used for receiving slice-related downlink user plane traffic (e.g., PoP 232 (FIG. 2B) associated with UE_U) and/or downlink control plane traffic (e.g., PoP 234 (FIG. 2B) associated with UE_C). This may, for example, be due to UE mobility within the RAN.

a change in the QoS parameters associated with the network slice user plane traffic and/or control plane traffic that can be supported by the RAN. This may, for example, be due to congestion or equipment failure within the RAN.

Association to a Default Network Slice

Figure 5:
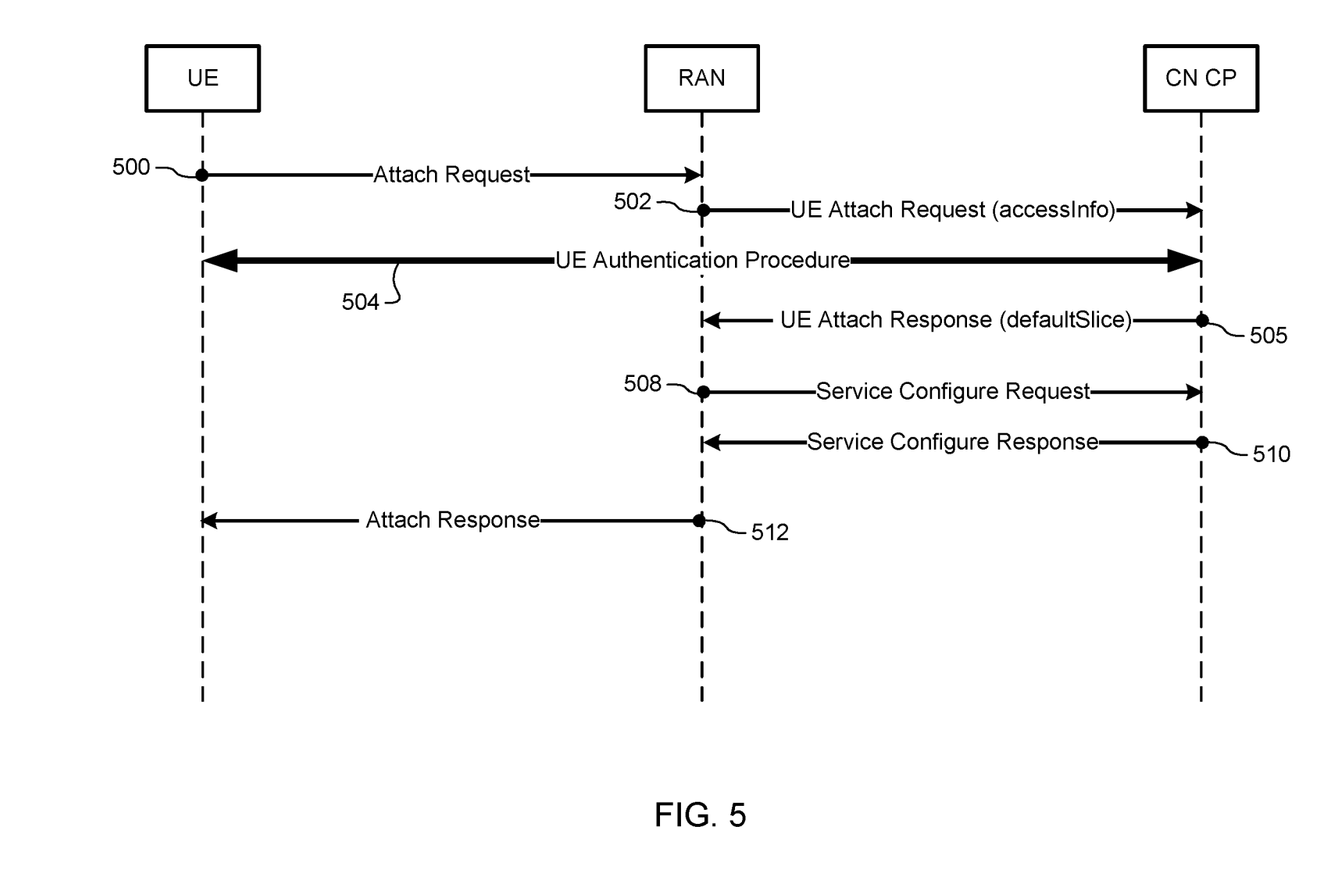
FIG. 5 is a message flow diagram illustrating a method for associating a user equipment to a default network slice, according to an embodiment.

Referring to FIG. 5, there is shown a message flow diagram illustrating an embodiment of the method in FIG. 3 used for associating a UE to a default network slice (and hence to a default network service). The default service may then be mapped by the RAN onto a pre-configured network slice.

The steps in the overall procedure of FIG. 5 are described below:

The UE sends a [RAN-UE CP] attach request (at 500) to the RAN requesting attachment to the network. The UE may include a multi-dimensional descriptor (descriptor) to request association with a particular service.

The RAN sends a [RAN-CN CP] UE attach request (at 502) to a pre-determined CN CP function (e.g. CPF-11). In some embodiments, the pre-determined CN CP function (CPF 11) may correspond to a POP (e.g., PoP 230, FIGS. 2B and 2C) associated with the common CN CP 212. If the UE provided a descriptor and if the RAN can match the descriptor to pre-configured or cached slice information, this information may be used by the RAN to select a corresponding CN CP function (CPF-11).

The UE attach request 502 includes information provided by the UE (e.g. device class, descriptor) and access information that may be used by the CN CP function (CPF-11) to identify a default network service. The access information may include the type of channel used to access the network, the location of the UE, etc. which may be provided by the RAN.

At this point, the CN authenticates the UE (at 504), obtains the UE service profile, and ensures that the UE is authorised to attach to the network. Messages exchanged between the UE and the CN (CPF-11) are relayed transparently by the RAN. In some scenarios, authentication may be performed by a slice-specific UE-CN CP function 208 following attachment of the UE to the default network slice (i.e. after step 512, below).

Once the CN has authorised the UE, the CN CP function (CPF-11) responds (at 506) to the RAN with a [RAN-CN CP] UE attach response that includes the default network slice to be associated with this UE. If the UE provided a descriptor in the attach request, the CN may or may not use this information when selecting the default network slice; this decision is transparent to the RAN.

The RAN may be pre-configured with information related to the designated slice, including:
- the identity (e.g. PoP 226) of a UE-CN UP function (e.g., UE_UPF) for receiving uplink user plane traffic associated with the network slice. This may also include TNL-specific information for communicating with the UE-CN UP function (UE_UPF).
- the RAN may not be configured with a UE-CN UP POP 226 (UE_UPF) if uplink packets provided by the UE are to be forwarded by the TNL using information (e.g. destination address) contained in a packet header.
- the user plane QoS parameters associated with the network slice.
- the identity (e.g. PoP 228) of the UE-CN CP function (e.g., UE_CPF) for receiving uplink signalling traffic associated with the commissioned network slice. This parameter is provided only if the network service includes slice-specific control plane functions for interacting with the UE. This parameter may also include TNL-specific information for communicating with the UE-CN CP function (UE_CPF).
- the control plane QoS parameters associated with the network slice. These parameters are provided only if the network service includes slice-specific control plane functions for interacting with the UE.
- the identity (e.g. PoP 230) of a RAN-CN CP function (e.g., CPF-13) associated with the commissioned network slice that enables the exchange of per-UE, per-slice control information between the RAN and CN. This parameter may also include TNL-specific information for communicating with the designated CP function (CPF-13).

If the RAN is not pre-configured with information for the designated slice, the procedure resumes at step 406 in FIG. 4.

In some instances, the UE attach response 506 can redirect the RAN to another CN CP entity for UE authentication and authorisation. This may, for example, be required if authentication and authorisation is performed by a per-slice CN CP function. In this case, the RAN repeats step 502 by sending the UE attach request to the designated CN CP entity.

If authorised, the RAN sends (at 508) a [RAN-CN CP] service configuration request to the pre-defined RAN-CN CP function (e.g., CPF-13) associated with the selected network slice. This request includes:
- the destination (e.g. PoP 232) within the RAN to be used by the network service for downlink UE-CN UP traffic sent to the UE. This parameter may also include TNL-specific information for communicating with the RAN.
- the destination (e.g. PoP 234) within the RAN to be used by the network service for downlink UE-CN CP traffic sent to the UE. This parameter may also include TNL-specific information for communicating with the RAN. This parameter is provided only if the network service includes slice-specific control plane functions (UE_CPF) for interacting with the UE.

Once configuration has been completed, the CN (CPF-13) sends (at 510) a [RAN-CN CP] service configuration response to the RAN.

The RAN sends (at 512) a [RAN-UE CP] attach response to the UE indicating successful attachment to the network.

Re-Attachment to a Network Slice

Figure 6:
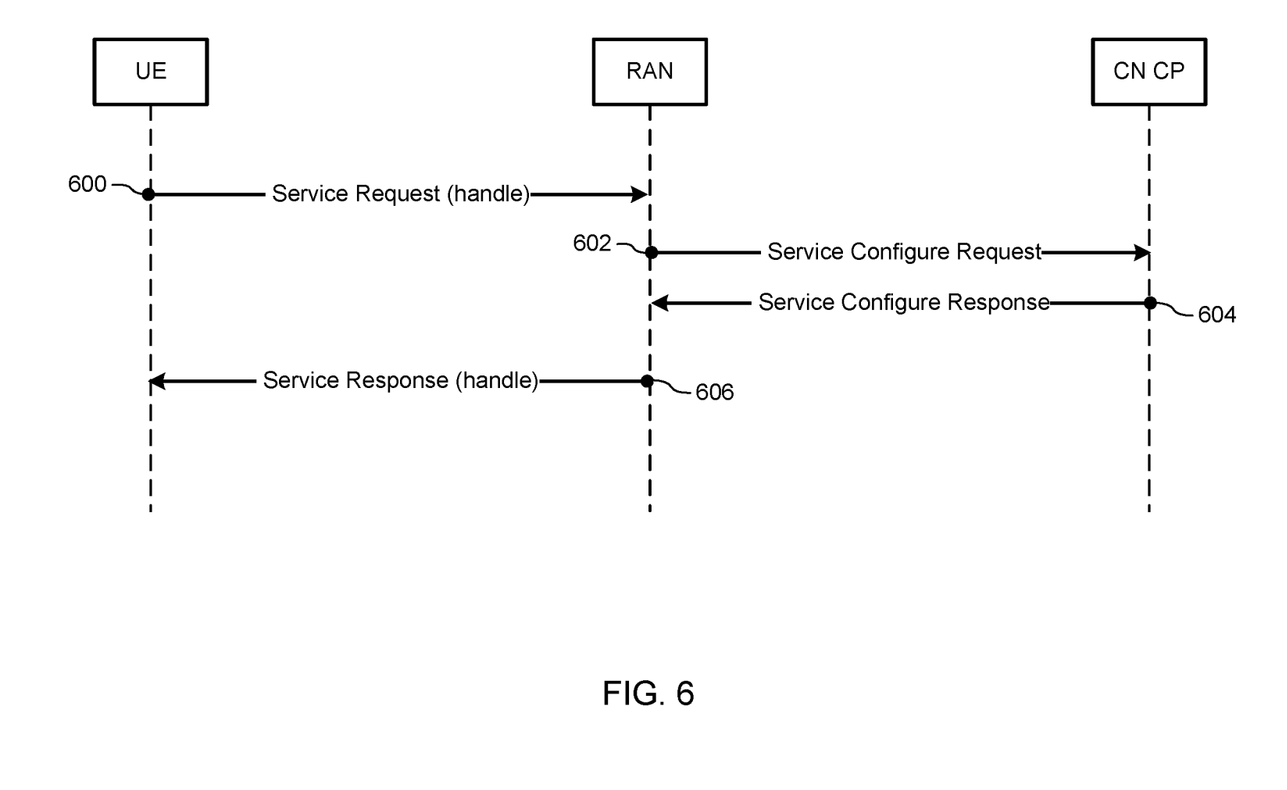
FIG. 6 is a message flow diagram illustrating a method for re-attaching a user equipment to a network slice, according to an embodiment.

Referring to FIG. 6, there is shown a message flow diagram illustrating an embodiment of the method in FIG. 3 used for re-attaching a UE to a network slice (and hence network service). In the illustrated procedure, context information maintained by the RAN is used to connect to the previously-determined network slice. Re-attachment to a network slice may be triggered by a specific service request, as illustrated below, or by some other event such as a re-attachment request or a change in RRC state.

The steps in the overall procedure of FIG. 6 are described below:

The UE sends (at 600) a [RAN-UE CP] service request to the RAN requesting re-attachment to a particular network service. Because this is a request for re-attachment to this service, the UE provides the handle that was previously supplied by the RAN following an initial service access request as described above with reference to step 416 of FIG. 4. To prevent misuse, the handle may be cryptographically protected by the network and binds the UE to a particular network slice instance for a prescribed period of time.

The RAN uses the handle to retrieve stored context information related to the referenced network slice. The stored context information includes:
- the identity (e.g. PoP 226) of a UE-CN UP function (e.g., UE_UPF) for receiving uplink user plane traffic associated with the network slice. This may also include TNL-specific information for communicating with the UE-CN UP function (UE_UPF).

the RAN may not have a UE-CN UP POP (UE_UPF) recorded if uplink packets provided by the UE are to be forwarded by the TNL using information (e.g. destination address) contained in a packet header.

the user plane QoS parameters associated with the network slice.

the identity (e.g. PoP 228) of the UE-CN CP function (e.g., UE_CPF) for receiving uplink signalling traffic associated with the commissioned network slice. This parameter exists only if the network service includes slice-specific control plane functions for interacting with the UE. This parameter may also include TNL-specific information for communicating with the UE-CN CP function (UE_CPF).

the control plane QoS parameters associated with the network slice. These parameters exist only if the network service includes slice-specific control plane functions for interacting with the UE.

the identity (e.g. PoP 230) of a RAN-CN CP function (e.g., CPF-23) associated with the commissioned network slice that enables the exchange of per-UE, per-slice control information between the RAN and CN. This parameter may also include TNL-specific information for communicating with the designated CP function (CPF-23).

If necessary, the RAN sends (at 602) a [RAN-CN CP] service configuration request to the RAN-CN CP function (CPF-23) associated with the network slice. This request includes:

the destination (e.g. PoP 232) within the RAN to be used by the network service for downlink UE-CN UP traffic sent to the UE. This parameter may also include TNL-specific information for communicating with the RAN.

the destination (e.g. PoP 234) within the RAN to be used by the network service for downlink UE-CN CP traffic sent to the UE. This parameter may also include TNL-specific information for communicating with the RAN. This parameter is provided only if the network service includes slice-specific control plane functions (UE_CPF) for interacting with the UE.

Note that this step (602) and the following step (604) are optional and only required if the destinations (e.g. PoPs) within the RAN to be used by the network slice for downlink traffic have changed (e.g. due to UE mobility).

Once configuration has been completed, the CN (CPF-23) sends (at 604) a [RAN-CN CP] service configuration response to the RAN.

The RAN sends (at 606) a [RAN-UE CP] service response to the UE indicating successful re-attachment to the network service. The response may include an updated handle that can be subsequently used by the UE to request reconnection to the network service (slice).

Figure 7:
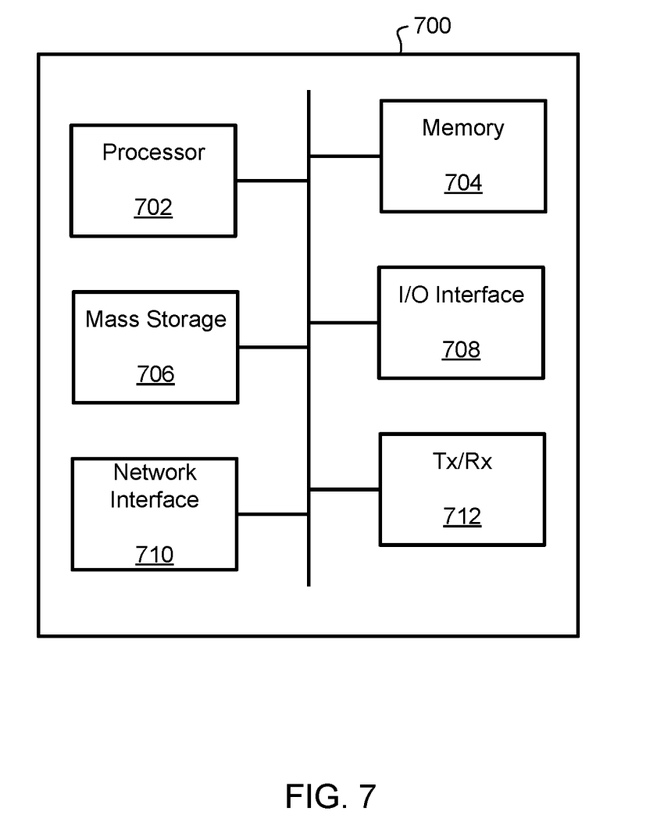
FIG. 7 is a schematic diagram of a hardware device, according to an embodiment

Referring to FIG. 7, there is shown a schematic diagram of a hardware device 100 that may for example, comprise a UE, RAN, or CN node, and or perform any or all of steps of methods described herein, according to different embodiments of the present invention.

As shown in FIG. 7, the device 700 includes a processor 702, memory 704, non-transitory mass storage 706, I/O interface 708, network interface 710, and a transceiver 712 all of which are communicatively coupled via bi-directional bus. According to certain embodiments, any or all of the depicted elements may be utilized, or only a subset of the elements. Further, device 700 may contain multiple instances of certain elements, such as multiple processors, memories, or transceivers. Also, elements of the hardware device may be directly coupled to other elements without the bi-directional bus.

The processor 702 may comprise any type of electronic data processor. Thus the processor 702 may be provided as any suitable combination of: one or more general purpose micro-processors and one or more specialized processing cores such as Graphic Processing Units (GPUs), Digital Signal Processors (DSPs) or other so-called accelerated processors (or processing accelerators). The memory 704 may include any type of non-transitory memory such as static random access memory (SRAM), dynamic random access memory (DRAM), synchronous DRAM (SDRAM), read-only memory (ROM), any combination of such, or the like. In an embodiment, the memory 704 may include ROM for use at boot-up, and DRAM for program and data storage for use while executing programs. The bus may be one or more of any type of several bus architectures including a memory bus or memory controller, a peripheral bus, or a video bus. The mass storage element 706 may include any type of non-transitory storage device, such as a solid state drive, hard disk drive, a magnetic disk drive, an optical disk drive, USB drive, or any computer program product configured to store data and machine executable program code. According to certain embodiments, the memory 704 or mass storage 706 may have recorded thereon statements and instructions executable by the processor 702 for performing any of the aforementioned method steps described above.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method comprising:
   upon successful authentication and authorization of a user equipment (UE) side apparatus, transmitting, by the UE side apparatus to a radio access network (RAN) node, a service request for an association to a network slice, the service request containing a descriptor identifying one of a plurality of network slices;

receiving, by the UE side apparatus from the RAN node, radio link configuration information comprising a first radio link logical channel between the RAN node and the UE side apparatus used to convey user plane information associated with the network slice associated with the descriptor and quality of service parameters associated with the first radio link logical channel;

transmitting, by the UE side apparatus to the RAN node, uplink user plane traffic comprising an uplink user plane protocol data unit associated with the first radio link logical channel so as to forward the uplink user plane protocol data unit to a first uplink point of presence associated with the first radio link logical channel; and receiving, by the UE side apparatus from the RAN node, a downlink user plane protocol data unit associated with the first radio link logical channel, wherein downlink user plane protocol data unit is associated with a first downlink point of presence associated with the user plane of the network slice associated with the descriptor and included in downlink user plane traffic from a second network node determined in accordance with the received service request.

2. The method of claim 1, wherein the method further comprises: transmitting, by the UE side apparatus to a control plane point of presence associated with a control plane of the network slice, control plane traffic via the RAN node.

3. The method of claim 1, wherein the radio link configuration further comprises a second radio bearer between the RAN node and the UE side apparatus used to convey user plane information associated with a second network slice associated with the descriptor, the second radio bearer associated with a second uplink point of presence.

4. The method of claim 1, further comprising receiving, by the UE side apparatus from the RAN node, a handle identifying the radio link configuration information associated with the network slice and identifying slice configuration information associated with the network slice associated with the descriptor.

5. The method of claim 1, wherein the service request comprises at least one of:
an identifier associated with a particular slice instance;
a handle identifying the radio link configuration information associated with the network slice associated with the descriptor and slice configuration information associated with the network slice associated with the descriptor.

6. The method of claim 1, wherein the descriptor comprises at least one of a type of service and a slice identifier.

7. An apparatus comprising:
one or more processors; and
a computer readable storage medium storing software instructions for execution by the one or more processors, the software instructions configured to control the one or more processors to:
upon successful authentication and authorization of the apparatus, transmit, to a radio access network (RAN) node, a service request for an association to a network slice, the service request containing a descriptor identifying one of a plurality of network slices;
receive, from the RAN node, radio link configuration information comprising a first radio link logical channel between the RAN node and the apparatus used to convey user plane information associated with the network slice associated with the descriptor and quality of service parameters associated with the first radio link logical channel;
transmit, to the RAN node, uplink user plane traffic comprising an uplink user plane protocol data unit associated with the first radio link logical channel so as to forward the uplink user plane protocol data unit to a first uplink point of presence associated with the first radio link logical channel; and
receive, from the RAN node, a downlink user plane protocol data unit associated with the first radio link logical channel, wherein downlink user plane protocol data unit is associated with a first downlink point of presence associated with the user plane of the network slice associated with the descriptor and included in downlink user plane traffic from a second network node determined in accordance with the received service request.

8. The apparatus of claim 7, wherein the radio link configuration further comprises a second radio bearer between the RAN node and the apparatus used to convey user plane information associated with a second network slice associated with the descriptor, the second radio bearer associated with a second uplink point of presence.

9. The apparatus of claim 7, the software instructions further configured to control the one or more processors to:
receive, from the RAN node, a handle identifying the radio link configuration information associated with the network slice and identifying slice configuration information associated with the network slice associated with the descriptor.

10. The apparatus of claim 7, wherein the service request comprises at least one of:
an identifier associated with a particular slice instance;
a handle identifying the radio link configuration information associated with the network slice associated with the descriptor and slice configuration information associated with the network slice associated with the descriptor.

11. The apparatus of claim 7, wherein the descriptor comprises at least one of a type of service and a slice identifier.

12. A method comprising:
upon successful authentication and authorization of a user equipment (UE), receiving, by a radio access network (RAN) node, a service request for an association to a network slice, the service request containing a descriptor identifying one of a plurality of network slices;
transmitting, by the RAN node to the UE, radio link configuration information comprising a first radio link logical channel between the RAN node and the UE used to convey user plane information associated with the network slice associated with the descriptor and quality of service parameters associated with the first radio link logical channel;
receiving, by the RAN node, uplink user plane traffic comprising an uplink user plane protocol data unit associated with the first radio link logical channel so as to forward the uplink user plane protocol data unit to a first uplink point of presence associated with the first radio link logical channel, the uplink user plane traffic is from the UE; and
transmitting, by the RAN node to the UE, a downlink user plane protocol data unit associated with the first radio link logical channel, wherein downlink user plane protocol data unit is associated with a first downlink point of presence associated with the user plane of the network slice associated with the descriptor and included in downlink user plane traffic from a second network node determined in accordance with the received service request.

13. The method of claim 12, further comprising:
transmitting, by the RAN node, to a second network node a request containing the descriptor;
receiving, by the RAN node from the second network node, slice configuration information comprising an address associated with the first uplink point of presence associated with a user plane of the network slice associated with the descriptor and user plane quality of service parameters associated with the user plane of the network slice associated with the descriptor.

14. The method of claim 12, further comprising:
transmitting by the RAN node to a third network node a request carrying the descriptor; and
receiving from the third network node an instruction to redirect the request carrying the descriptor to the second network node.

15. The method of claim 12, wherein the radio link configuration further comprises a second radio bearer between the RAN node and the UE used to convey user plane information associated with a second network slice associated with the descriptor, the second radio bearer associated with a second uplink point of presence.

16. The method of claim 12, further comprising transmitting, by the RAN node to the UE, a handle identifying the radio link configuration information associated with the network slice and identifying slice configuration information associated with the network slice associated with the descriptor.

17. The method of claim 12, wherein the service request comprises at least one of:
an identifier associated with a particular slice instance;
a handle identifying the radio link configuration information associated with the network slice associated with the descriptor and slice configuration information associated with the network slice associated with the descriptor.

18. The method of claim 12, wherein the descriptor comprises at least one of a type of service and a slice identifier.

19. An apparatus comprising:
one or more processors; and
a computer readable storage medium storing software instructions for execution by the one or more processors, the software instructions configured to control the one or more processors to:
upon successful authentication and authorization of a user equipment (UE), receive a service request for an association to a network slice, the service request containing a descriptor identifying one of a plurality of network slices;
transmit to the UE, radio link configuration information comprising a first radio link logical channel between the radio access network (RAN) node and the UE used to convey user plane information associated with the network slice associated with the descriptor and quality of service parameters associated with the first radio link logical channel;
receive uplink user plane traffic comprising an uplink user plane protocol data unit associated with the first radio link logical channel so as to forward the uplink user plane protocol data unit to a first uplink point of presence associated with the first radio link logical channel, the uplink user plane traffic is from the UE; and
transmit to the UE, a downlink user plane protocol data unit associated with the first radio link logical channel, wherein downlink user plane protocol data unit is associated with a first downlink point of presence associated with the user plane of the network slice associated with the descriptor and included in downlink user plane traffic from a second network node determined in accordance with the received service request.

* * * * *